UNITED STATES PATENT OFFICE.

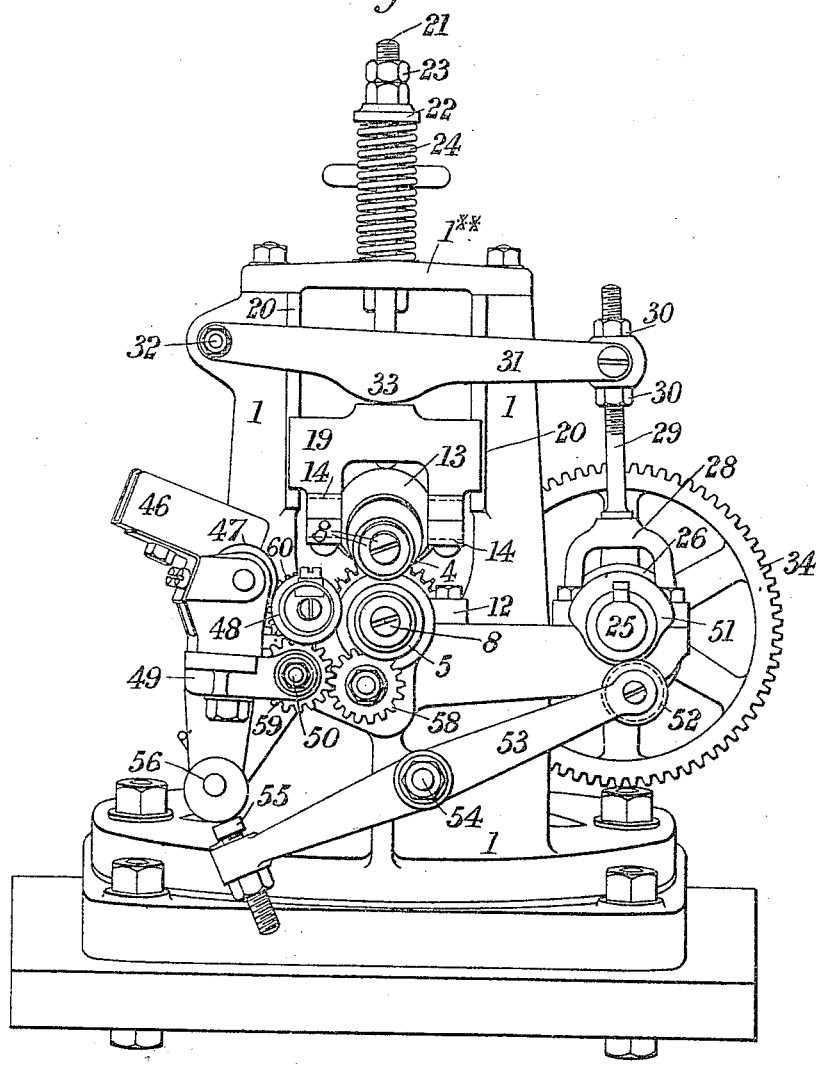

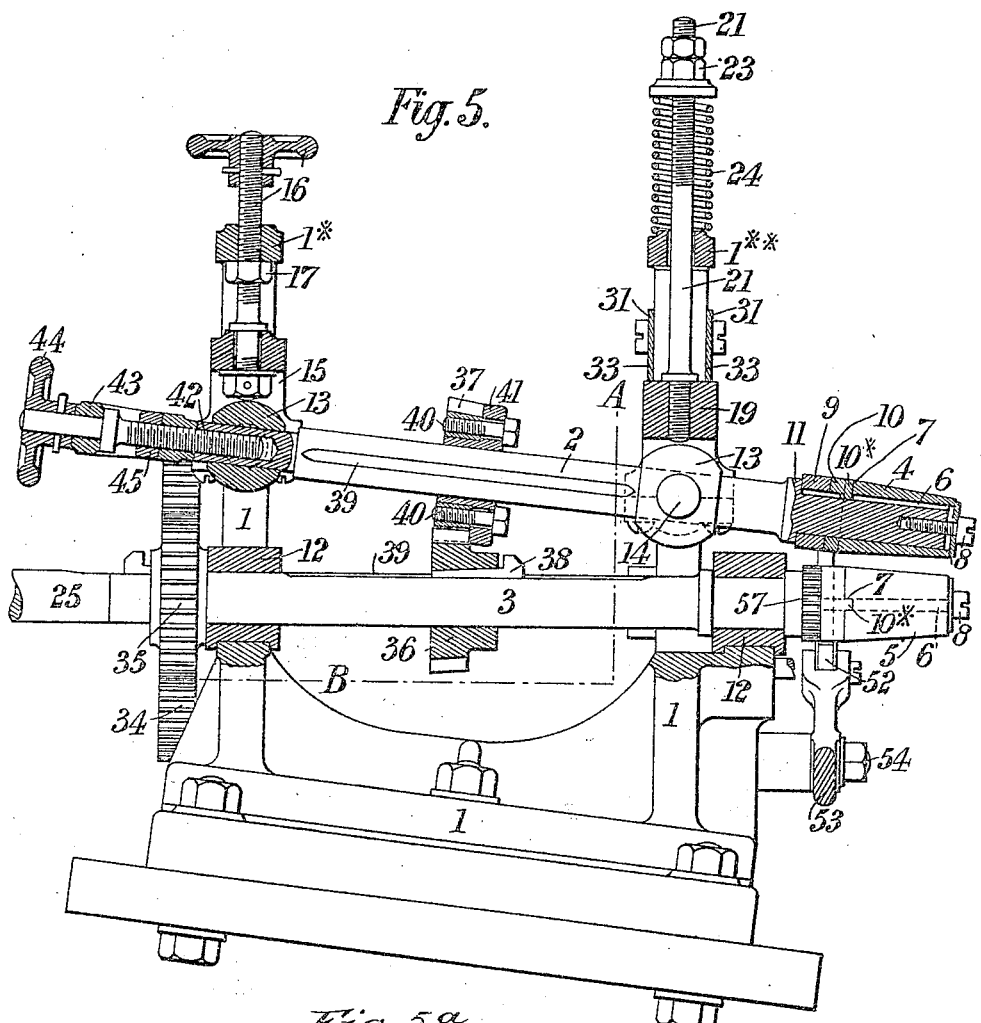
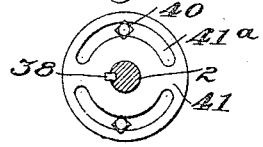

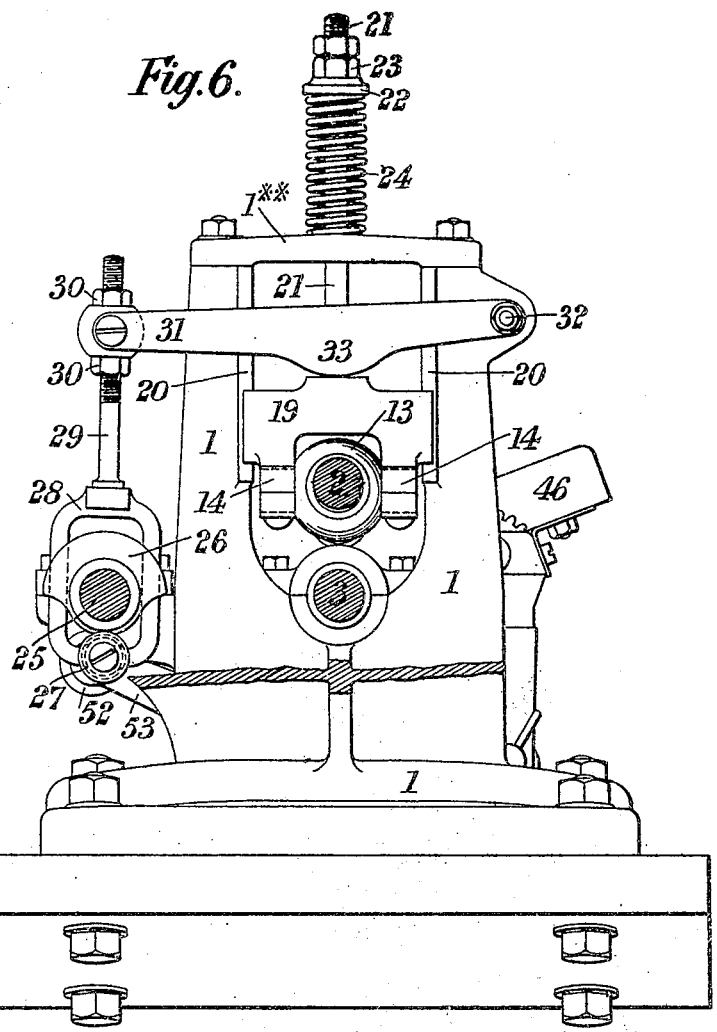

FREDERICK ALEXANDER GARIBALDI ROBIN, OF CHARTERHOUSE SQUARE, COUNTY OF LONDON, ENGLAND, ASSIGNOR OF ONE-HALF TO BETTS & COMPANY LIMITED, OF LONDON COUNTY, ENGLAND.

APPARATUS FOR EMBOSSING METALLIC CAPSULES AND SIMILAR ARTICLES.

No. 801,107.        Specification of Letters Patent.        Patented Oct. 3, 1905.

Application filed November 28, 1904. Serial No. 234,673.

*To all whom it may concern:*

Be it known that I, FREDERICK ALEXANDER GARIBALDI ROBIN, engineer, a subject of the King of Great Britain and Ireland, residing at 14 Charterhouse Square, in the county of London, England, have invented new and useful Improved Apparatus for Embossing Metallic Capsules and Similar Articles, of which the following is a specification.

The object of this invention is to provide a machine for embossing metallic capsules or the like of various sizes and shapes. For the purposes of description I will presume that the articles to be embossed are capsules. The capsules are embossed between two rotating bodies constituting dies and having formed thereon and therein the devices to be embossed upon the capsules. The said dies are carried on spindles, one spindle carrying the male portion of the die and the other spindle carrying the female portion of the die and one of the said spindles being rotatable in fixed bearings, while the other spindle is capable of being moved toward and away from the spindle mounted in fixed bearings, so as to allow of the capsules being placed in position to be embossed and of being removed after embossing. In a machine made in accordance with my invention the embossing-dies are secured to the spindles so that they can be removed and others put in their places to suit any size and shape of capsule to be embossed. In order that the machine may be used for embossing capsules of various degrees of taper, the angular position of one or both of the spindles carrying the dies can be adjusted as required to suit the taper of any particular capsules to be embossed, which adjustment can be effected by altering the position of the bearings in which the spindle rotates. One or other, or both, of the spindles may also be adjustable longitudinally, so as to suit the position of the embossing portions of the dies. One or other, or both, of the gear-wheels on the respective spindles by which motion of rotation is conveyed from the one to the other for rotating the dies at the same circumferential speed may be connected with the said spindle or spindles, so that on releasing the means of connection the said spindle or spindles can be turned in the gear wheel or wheels to relatively adjust circumferentially the dies without putting the wheels out of gear with each other.

I will describe, with reference to the accompanying drawings, a machine constructed in accordance with my invention, premising that I do not limit myself to the precise details illustrated.

Figure 1:
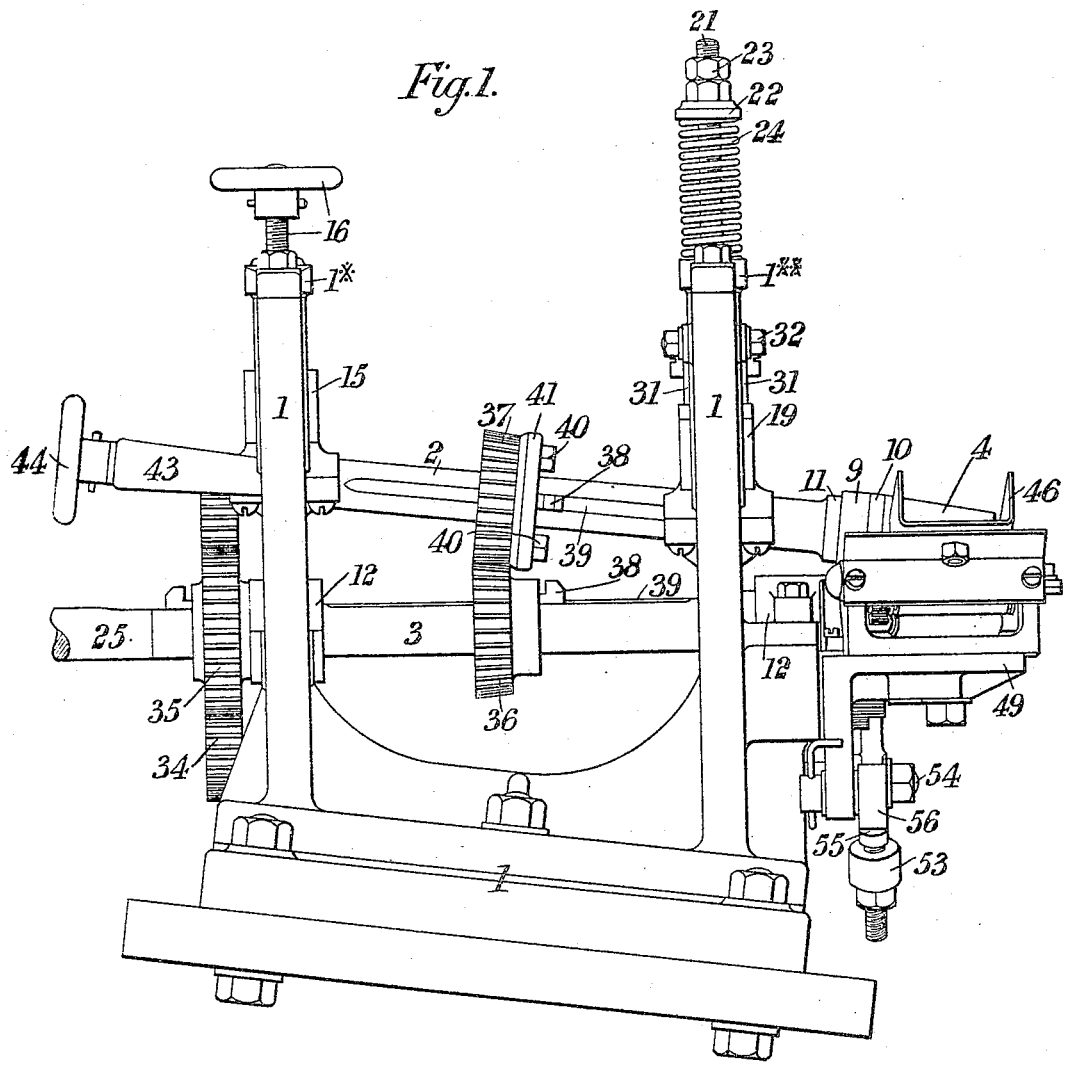
Figure 2:
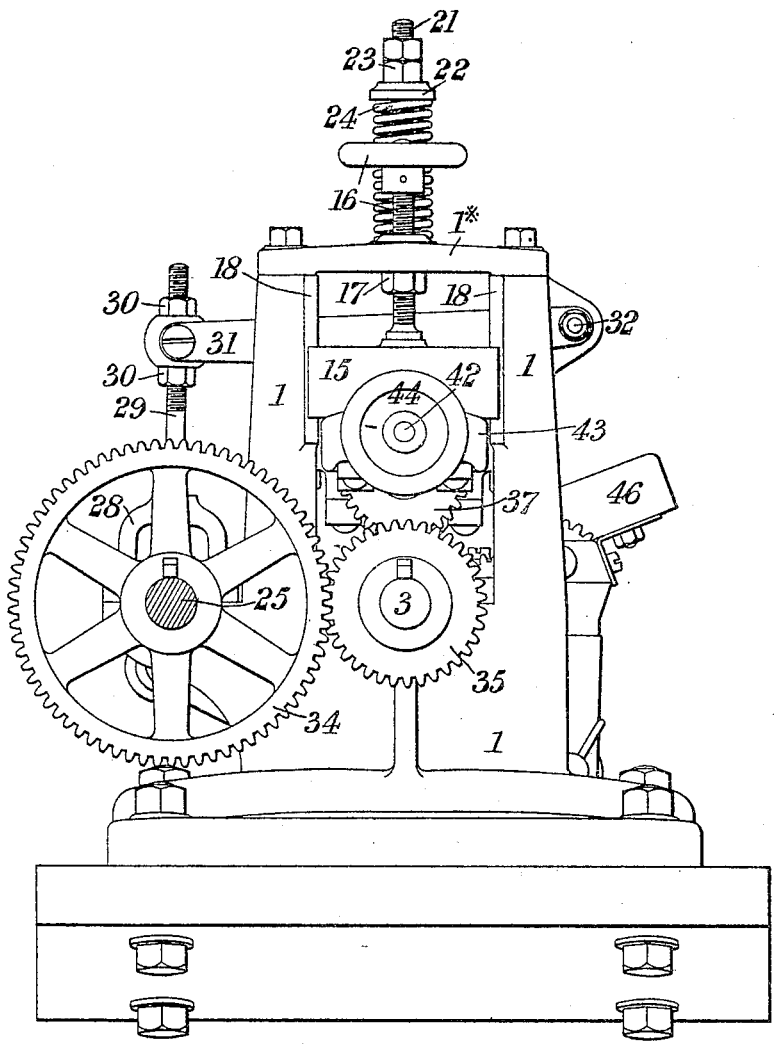
Figure 3:
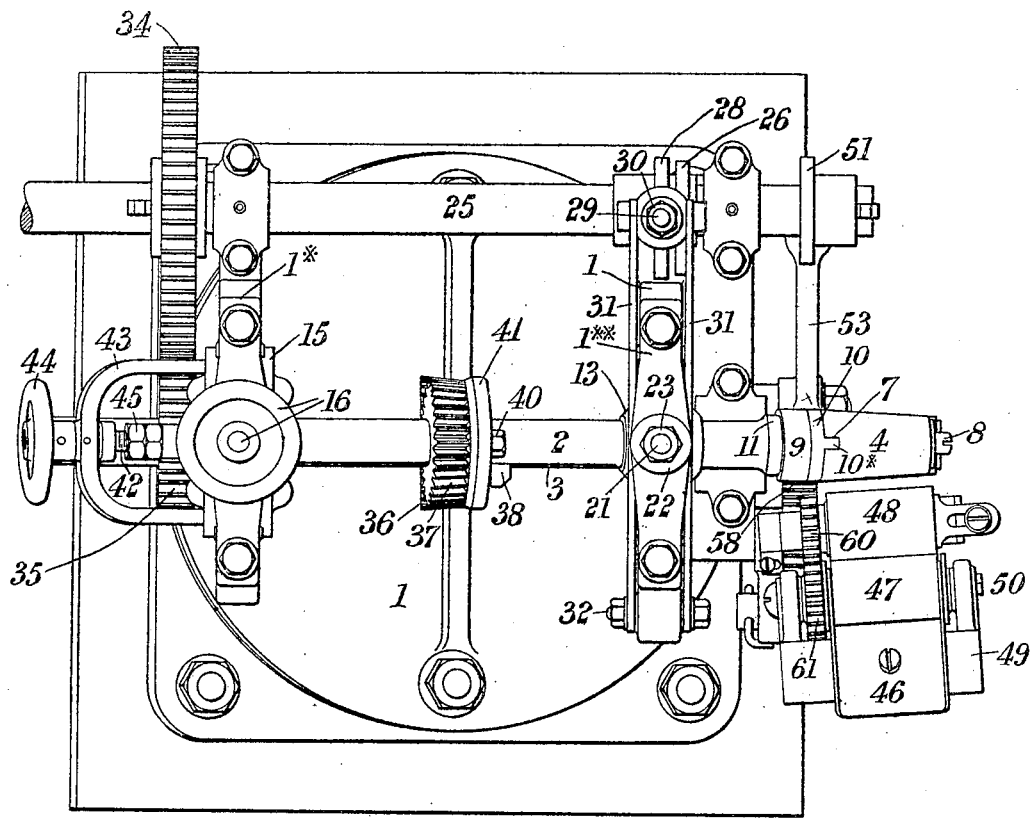

Figure 1 is a side elevation. Fig. 2 is a back elevation. Fig. 3 is a plan. Fig. 4 is a front elevation. Fig. 5 is a longitudinal section. Fig. 5$^a$ is a detail section on the line $a$ $b$ of Fig. 5, and Fig. 6 is a transverse section on the line A B as seen from the back of the machine.

A suitable framing 1 carries the several parts. The spindles 2 and 3 carry at their forward ends the respective parts 4 and 5 of the embossing device—that is, the female die or counterpart and the male die, these being each secured to the spindles 2 and 3 laterally by means of a groove 6 in the spindle and a notch 7 in the rear end of the die, with which groove and notch engages a projection 10$^*$ on a collar 10, and endwise by a screw and washer, as at 8, so that the dies can be readily removed and replaced by others according to the size or shape of the capsules and the device to be embossed thereon. The dies may be all the same length, or filling-pieces, as at 9, may be used to fill up the space between short dies and the shoulders 11 on the spindles. The spindle 3 is mounted in fixed bearings 12, and the spindle 2 is mounted in bearings 13, provided with trunnions 14. The trunnions of the rear bearing are carried in a saddle-piece 15, capable of being vertically adjusted on guides 18 in the framing 1 by the hand-wheel and screw 16 (screwing through a threaded hole in the cross-piece 1$^*$ of the framing and rotating freely in the saddle-piece 15 and fixed in the adjusted position by the lock-nut 17) to suit dies and capsules of different degrees of taper. The trunnions of the forward bearing are carried in a saddle-piece 19, sliding along guides 20 at each side of the framework and having a rod 21 extending upward through the cross-piece 1$^{**}$ of the framing and provided with a washer 22, confined by nuts 23, pressed upward by a spring 24, bearing also on the said cross-piece. The main shaft 25 (provided with fast and loose pulleys and driven by any suitable motor) has keyed to it a cam 26, which at each revolution of the shaft 25 acts on a roller 27, mounted on the yoke-piece 28, adjustably connected by the screwed rod 29 and nuts 30 and swivel-joint, as shown, with the double lever 31, centered at 32 and having projections 33 bearing on the top of the saddle 19, so as to force it and the bearing 13 and spindle 2, carried by it, and consequently the die 4, down to the die 5, the spring 24 raising the saddle 19, bearing 13, spindle 2, and die 4 at the period of each revolution of the shaft 25, during which the cam 26 is out of action, so that the embossed capsules can be removed from the die 5 and fresh capsules be put on the said die to be embossed when the cam 26 again comes into action. The shaft 25 is provided with a toothed wheel 34, which gears with a pinion 35 on the spindle 3 to rotate it and the die carried by it, motion being conveyed from the spindle 3 to the spindle 2 and the die carried by it by toothed wheels 36 and 37, fastened to each spindle by a key 38, engaging in a groove 39, so that the said wheels are adjustable to and fixable in any required position along the respective spindles 2 and 3. The wheel 37 is shown (see Figs. 5 and 6) as being secured by bolts or screws 40 passing through arc-shaped holes in a disk 41, keyed to the spindle 2. The said wheel 37 can be disconnected from the disk 41 by loosening the screws and one of the spindles be rotated relatively to the other to circumferentially adjust the position of the dies relatively to each other, after which the screws are again tightened without putting the wheels 36 and 37 out of gear or displacing them longitudinally.

The spindle 2 is made adjustable lengthwise to adjust longitudinally the position of one die relatively to the other, this being effected by making the end of the spindle capable of sliding longitudinally in its bearings 13 and forming a screw-threaded aperture in it in which engages a screw 42, secured in a bracket 43, (projecting from the bearing 13 at that end,) so as to be capable of rotating, but not of moving longitudinally, thereon, and provided with a hand-wheel 44 and with lock-nuts 45 to fix the screw when adjustment has been made.

Combined with the machine I have shown an arrangement for applying color to the capsules, which arrangement may or may not be used, as desired. The coloring-matter is placed in the trough 46 and is conveyed by the roller 47 to the rotary pad 48, which can be adjusted longitudinally and axially to suit the particular capsules being operated upon. These parts are carried on a bracket 49, capable of turning on a pin 50 on the frame of the machine to bring the coloring device into and out of operation, which is done by means of the cam 51 on the driving-shaft 25, acting on a roller 52 on one end of the lever 53, centered at 54 to the frame, the other end of the lever 53 being provided with a screw 55, acting on an eccentrically-mounted disk 56, carried by an extension of the bracket 49. Rotary motion is conveyed from the spindle 3 to the roller 47 and pad 48 through the gear 57, 58, 59, and 60.

Having now particularly described and ascertained the nature of the said invention and in what manner the same is to be performed, I declare that what I claim is—

1. In apparatus for embossing metallic capsules and similar articles; two rotatable spindles carrying removable embossing-dies, and means for temporarily securing the dies to the said spindles, the said spindles being mounted so that the dies can be moved apart, or away from each other, and brought toward each other, alternately, means for driving the said spindles; and means comprising a threaded aperture in one of said spindles, a screw engaged therein on rotation of which the spindle is longitudinally moved, and means for rotating said screw.

2. In apparatus for embossing metallic capsules and similar articles; two rotatable spindles carrying removable embossing-dies, and means for temporarily securing the dies to the said spindles, the said spindles being mounted so that the dies can be moved apart, or away from each other, and brought toward each other, alternately, and means for driving the said spindles; and means for connecting the gear-wheels to the spindles, or one of the gear-wheels to one of the spindles, so that the said wheel, or wheels, can be released to adjust the dies circumferentially, relatively to each other, without putting the said gear-wheels out of gear.

In testimony whereof I have signed this specification in the presence of two subscribing witnesses.

FREDERICK ALEXANDER GARIBALDI ROBIN.

Witnesses:
  FRED POPPLE,
  GILBERT STEWART LOCKY, Sr.